(No Model.)

D. W. POTTER.
CREAMING CAN.

No. 243,969. Patented July 5, 1881.

WITNESSES
Fred. G. Dieterich
P. C. Dieterich

INVENTOR
David W. Potter
By his Attorneys,
Louis Bagger & Co.

UNITED STATES PATENT OFFICE.

DAVID W. POTTER, OF HOOSICK FALLS, NEW YORK.

CREAMING-CAN.

SPECIFICATION forming part of Letters Patent No. 243,969, dated July 5, 1881.

Application filed April 5, 1881. (No model.)

*To all whom it may concern:*

Be it known that I, DAVID W. POTTER, of Hoosick Falls, in the county of Rensselaer and State of New York, have invented certain new and useful Improvements in Creaming-Cans; and I do hereby declare that the following is a full, clear, and exact description of the invention, which will enable others skilled in the art to which it appertains to make and use the same, reference being had to the accompanying drawings, which form a part of this specification, and in which—

Figure 1:
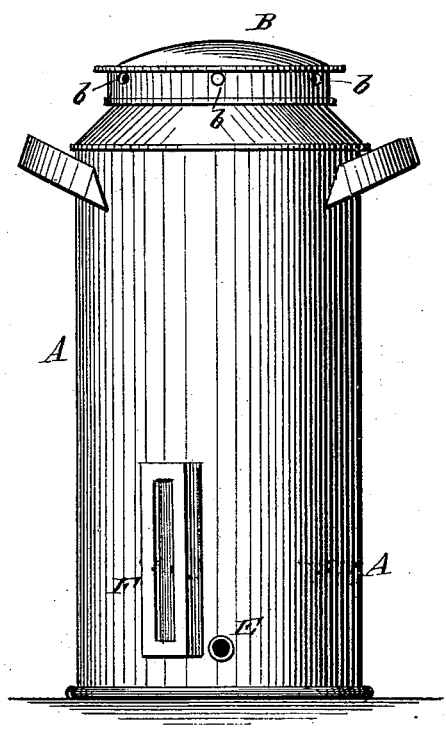
Figure 2:
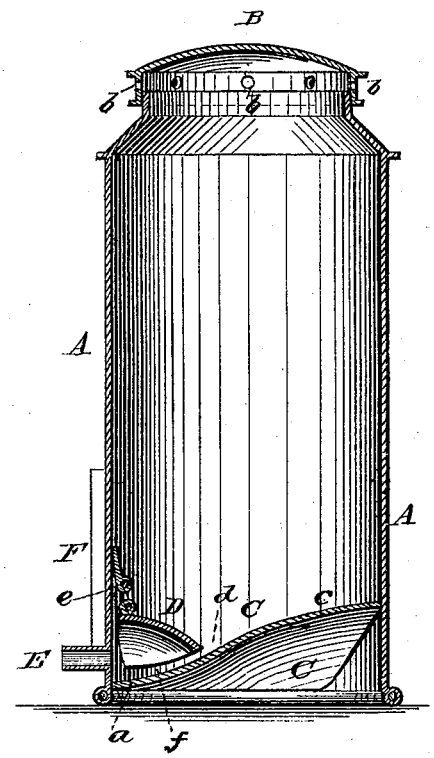
Figure 3:
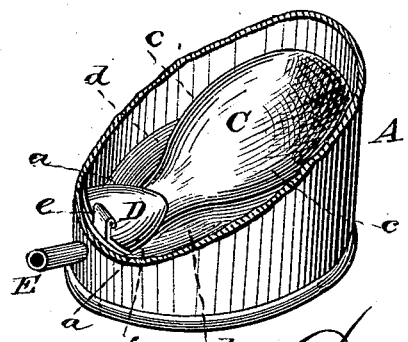

Figure 1 is a front elevation. Fig. 2 is a vertical section; and Fig. 3 is a perspective inside view of the inclined bottom with its hinged shield or guard.

Similar letters of reference indicate corresponding parts in all the figures.

My invention relates to cans for "setting" milk for the purpose of raising cream; and it consists in the improvements hereinafter set forth, and particularly pointed out in the claim.

In the annexed drawings, A is a sheet-metal can of suitable size, having a cover, B, provided with ventilating-openings $b\,b$ in its rim or flange, so that by raising the cover upon the neck of the can until the apertures $b\,b$ are clear of it air may be let into the can.

C is the inclined bottom, which is convexo-concave in shape, tapering to a point at its lowest part, as shown at $a$, but increasing in width at its upper part, as shown at $c$, thus forming two converging side channels, $d\,d$, meeting at the outlet E.

D is a convex or spoon-shaped shield, which is hinged at $e$ upon the inner side of the can, immediately over the outlet. This shield conforms in shape to that part of the convexo-concave bottom over which it is placed, so as to leave a narrow inlet, $f$, all around. F is a gage glass or window, which is inserted into the wall of the can, through which to observe its contents in drawing off the milk from the cream.

One or more of these cans, filled with sweet milk, is or are inserted into a suitably-constructed refrigerating-tank, the outlet E being stopped with a plug or faucet. After the cream has "set" the milk is drawn off through pipe E, and during this operation is prevented from eddying by the outlet-shield D. The peculiar shape of the bottom causes all the milk to be drawn off before any part of the cream will begin to flow, and feeds the skim-milk or cream (as the case may be) evenly to the outlet through the narrow space $f$ underneath the rim of the shield. By hinging this in the manner described, instead of attaching it rigidly to the side of the can, it may, on reversing the can, be turned up or away from the bottom, so as to facilitate its cleansing, it being of the greatest importance in cans of this class that they shall always be perfectly sweet and clean, without any sediment or curd, which, even in minute quantities, would be liable to sour the milk and frustrate the creaming operation.

Having thus described my invention, I claim and desire to secure by Letters Patent of the United States—

The creaming-can herein described, consisting of the can A, having the concavo-convex bottom C downwardly inclined from the back and gradually narrowed to a point, $a$, at the exit, the hinged part D, having its outer edge formed to correspond with the convex surface of the part C, and adapted to provide a curved narrow channel, $f$, between the two, to prevent eddying of the milk and disturbance of the cream, the glass gage F and outlet E, to which the current of milk is tortuously impelled by its gravity, as specified.

In testimony that I claim the foregoing as my own I have hereto affixed my signature in presence of two witnesses.

DAVID W. POTTER.

Witnesses:
LEWIS D. KING,
A. M. CUMMINGS, Jr.